A. D. CONVERSE.
VEHICLE.
APPLICATION FILED JUNE 5, 1916.
1,209,398.
Patented Dec. 19, 1916.
2 SHEETS—SHEET 1.
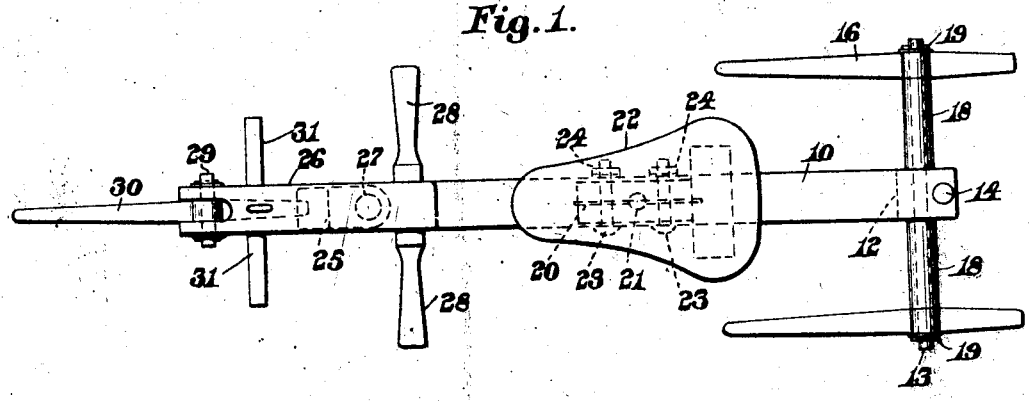
Fig. 1.
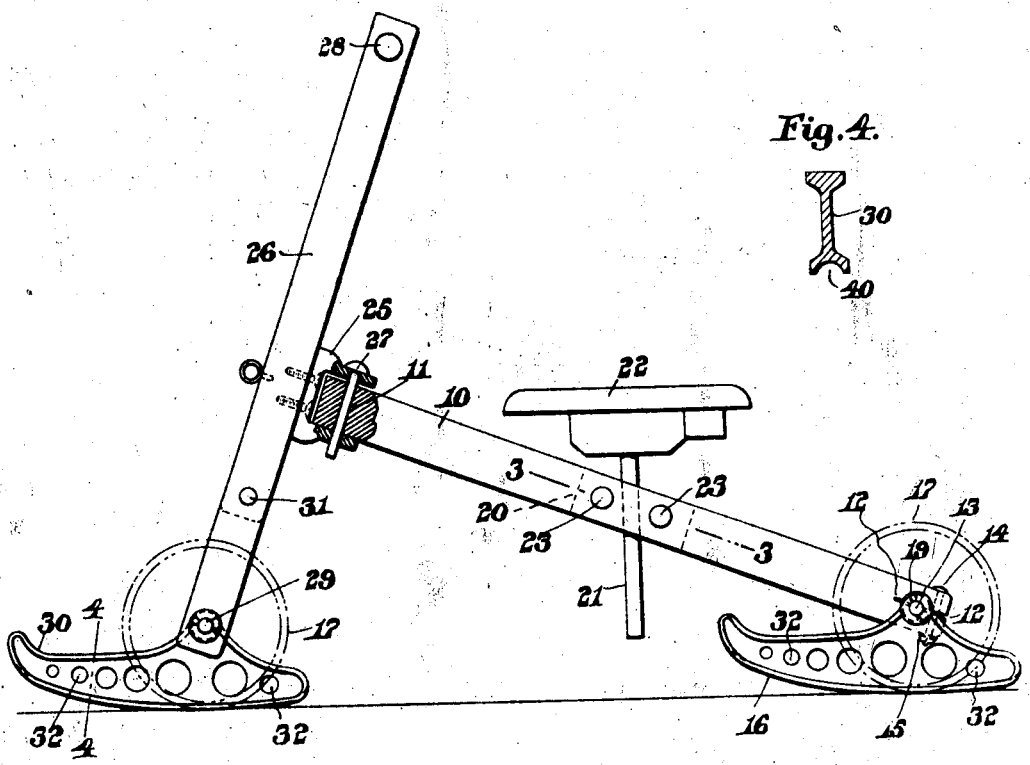
Fig. 2.
Fig. 4.
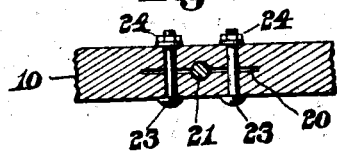
Fig. 3.
Inventor:
Atherton D. Converse,
by Walter E. Lombard,
Atty.

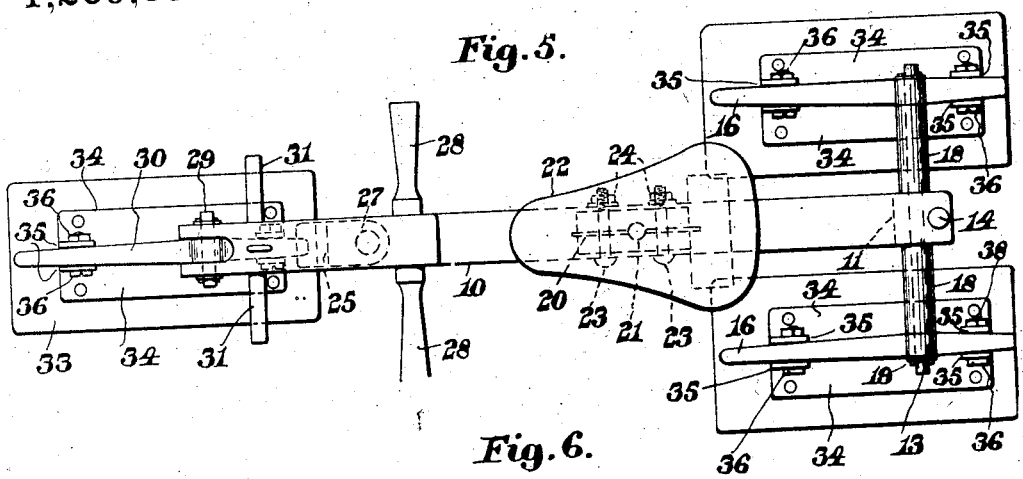
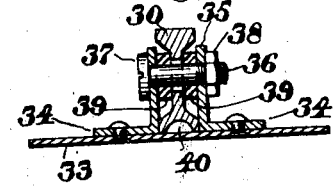
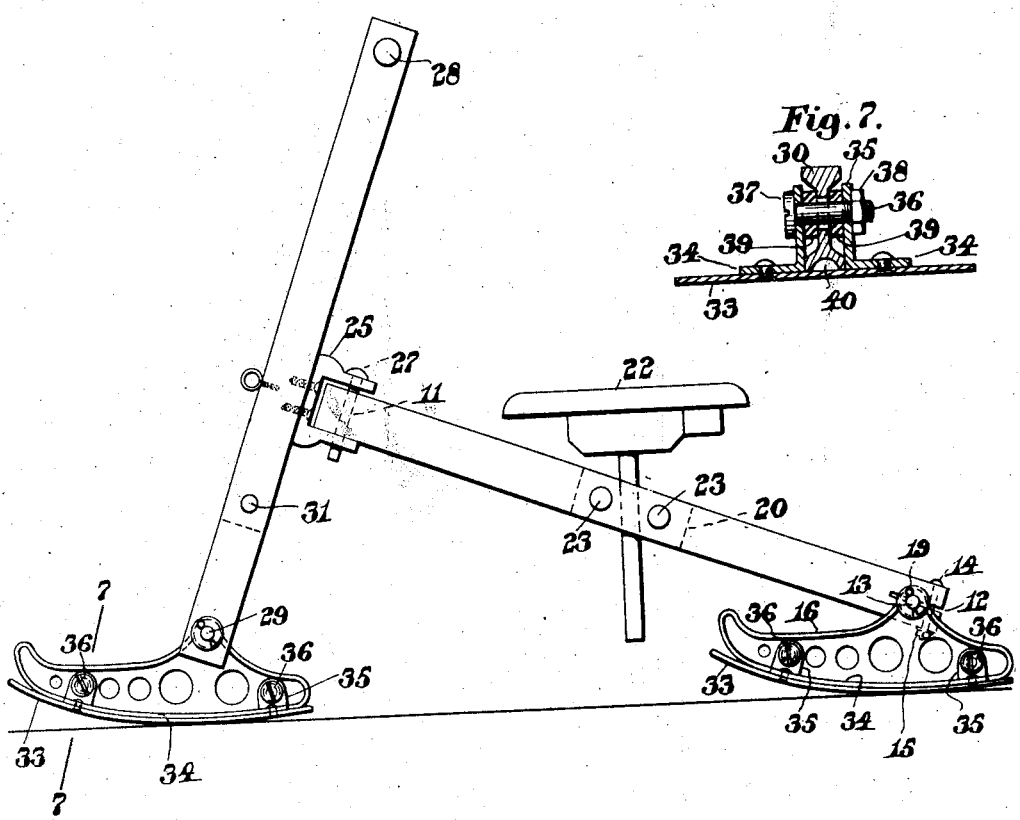

UNITED STATES PATENT OFFICE.

ATHERTON D. CONVERSE, OF WINCHENDON, MASSACHUSETTS.

VEHICLE.

1,209,398. Specification of Letters Patent. Patented Dec. 19, 1916.

Application filed June 5, 1916. Serial No. 101,851.

*To all whom it may concern:*

Be it known that I, ATHERTON D. CONVERSE, a citizen of the United States of America, and a resident of Winchendon, in the county of Worcester and Commonwealth of Massachusetts, have invented certain new and useful Improvements in Vehicles, of which the following is a specification.

This invention relates to vehicles and particularly to vehicles to be used by children, and which may be propelled by the feet of the rider.

The invention consists of a novel framework carrying a seat and having a suitable steering mechanism, said frame-work being provided with suitable supports on which either wheels or runners may be positioned, thereby adapting the vehicle for use either on ground or ice.

The invention further consists in the provision of means to be clamped to the runners whereby the vehicle may be adapted for use on soft snow.

The invention consists further in certain novel features of construction and arrangement of parts which will be fully understood by reference to the description of the drawings and to the claim hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of these instrumentalities as herein shown and described.

Of the drawings, Figure 1 represents a plan of a vehicle embodying the principles of the present invention. Fig. 2 represents a side elevation of the same. Fig. 3 represents a section on line 3—3 on Fig. 2. Fig. 4 represents a section on line 4—4 on Fig. 2. Fig. 5 represents a plan of the vehicle with snow shoes attached to the runners. Fig. 6 represents a side elevation of the same, and Fig. 7 represents a section on line 7—7 on Fig. 6.

Similar characters designate like parts throughout the several figures of the drawings.

In the drawings, 10 is an inclined beam provided at its upper forward end with the hole 11 extending therethrough and at its lower rear end with a laterally extending slit 12. Extending transversely through the slit 12 is a metal rod 13 clamped in position by means of the securing member 14 extending through the extreme lower end of the beam 10 perpendicularly to the slit 12.

The member 14 is provided with a head at one end and has a nut 15 threaded to its opposite end. When the rod 13 has been properly positioned, by adjusting the nut, 15, the two portions of the end of the beam 10 on either side of the slit 12 may be brought together and securely clamp the rod 13 in its adjusted position. At either end of the rod 13 is a traction member 16 which may be a runner, as shown in Figs. 1 and 2 of the drawings, or may be a wheel, as shown in dotted lines at 17 in Fig. 2 of the drawings.

Between the traction members 16 and the side faces of the beam 10 are sleeves 18 surrounding the rod 13 and retaining the runners 16 at equal distance from the side faces of said beam 10.

The traction members 16 are prevented from becoming displaced by means of the cotter pins 19 extending through the extreme outer ends of the rod 13. Intermediate the ends of the beam 10 is a vertical slot 20 through which extends a cylindrical support 21, to the upper end of which is secured the seat 22. The cylindrical support 21 extends diagonally through the slot 20, thereby retaining the seat 22 in horizontal position. On either side of the support 21 and extending through the beam 10 and across the slot 20 are two bolts 23 provided with heads at one end and nuts 24 threaded to the opposite end. When the support 21 has been positioned in the slot 20 and the nuts 24 have been adjusted, the side walls of the slot 20 may be forced into firm contact with said support 21 and retain it in its adjusted position. The seat 22 is adjusted to such a height that the occupant thereof may touch the ground or ice on which the vehicle rests and use his feet as a propelling force to move the vehicle.

The forward end of the beam 10 rests in the bifurcated member 25 secured to the rear face of a steering member 26 perpendicularly disposed relatively to the inclined beam 10. The bifurcated member 21 has alined openings therein to receive the pivot pin 27 which is adapted to extend through these openings and the hole 11 in the forward end of the beam 10.

The upper end of the steering member 26 is provided with handles 28 extending laterally therefrom by which the steering member may be moved about the axis of the pivot 27. The lower end of the steering member is bifurcated and has a pin 29 extending therethrough, said pin also extending through the traction member 30. Near the lower end of the steering member 26 and extending laterally from the side faces thereof are foot rests 31 on which the rider may place his feet when coasting. When the traction members are runners, as shown in full lines in Figs. 1 and 2 of the drawings, the web thereof is provided with a plurality of openings 32 extending therethrough.

In case it is desired to use the vehicle upon soft snow, a snow shoe or plate 33 may be secured to the bottom of each runner. The upper face of the shoe or plate 33 has secured thereto a pair of parallel plates 34 separated a distance equal to the thickness of the runner 16 or 30. These plates 34 have upwardly extending ears 35 thereon through which extend bolts 36, said bolts also extending through openings 32 in the runner. One end of the bolt 36 is provided with a head 37, and the opposite end has threaded thereto the nut 38. Between each ear 35 and the web of the runner 16 or 30 is interposed a washer 39. By adjusting the nut 36 the shoes or plates 33 may be clamped firmly in position and the vehicle may then be used to coast over the snow.

When the vehicle is used on ice, the runners 16—16 and 30 are used and the under face thereof is provided with a groove 40, thereby giving sharp edges to contact with the surface of the ice over which the vehicle is moving. By constructing the frame in this manner of a single inclined beam with a steering member pivoted to the forward end thereof, the cost of manufacture is materially decreased, and ample space is provided for the legs of the occupant of the seat 22. Great freedom of movement of the legs is thereby secured so that the vehicle may be propelled by either or both feet of the rider.

When it is desired to use the vehicle upon the ground the runners 16—16 and 30 may be quickly removed and wheels such as indicated in dotted lines at 17 may be substituted therefor. It is obvious, therefore, that the vehicle may be converted quickly for use either on the ground or the ice or upon the snow. When not in use, the various parts may be quickly dismembered and stored away, occupying but very little space. This is a great advantage in shipping the goods to wholesalers, and also of advantage to the wholesalers prior to delivery to the retailers. The runner 30 may be removed from the steering member 26 by first removing the pin 29. The runners 16 may be readily removed from the rod 13 by first removing the cotter pins 19. The rod 13 and the sleeves 18 mounted thereon may be removed from the beam by loosening the nut 15. In a similar manner, the seat 22 may be removed from the beam by loosening the nuts 24. The beam 10 may be removed from the steering member by first removing the pivot pin 27. When these operations have been performed, the various dismembered parts may be packed in small space.

It is believed that the operation and many advantages of this invention will be fully understood from the foregoing description.

Having thus described my invention, I claim:

In a device of the class described, an inclined beam having a transverse slit in its lower end; a steering member pivoted to the forward end of said beam and perpendicular thereto; a rod positioned in the slit at the rear end of said beam; means for clamping said rod in position; traction members on said rod and the lower end of said steering member; and sleeves surrounding the opposite ends of said rods between said beam and said traction members.

Signed by me at Winchendon, Mass., this second day of June, 1916.

ATHERTON D. CONVERSE.

Witnesses:
 CORA L. SYMONS,
 PEARL M. HALL.